No. 755,753. PATENTED MAR. 29, 1904.
J. C. DAVIS.
HOG TROUGH.
APPLICATION FILED OCT. 29, 1903.
NO MODEL. 2 SHEETS—SHEET 1.
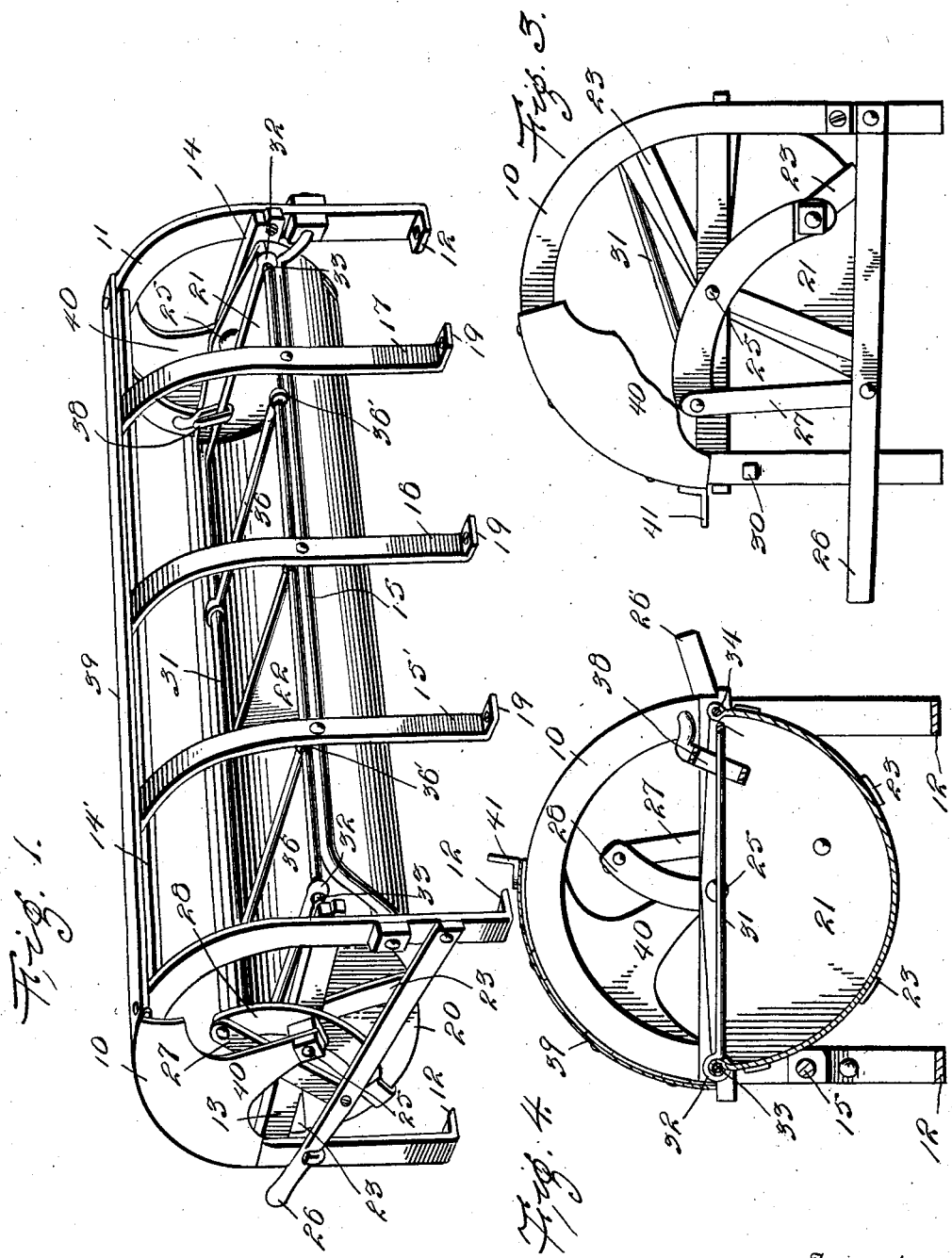
Witnesses
Inventor
John C. Davis
By
Attorneys

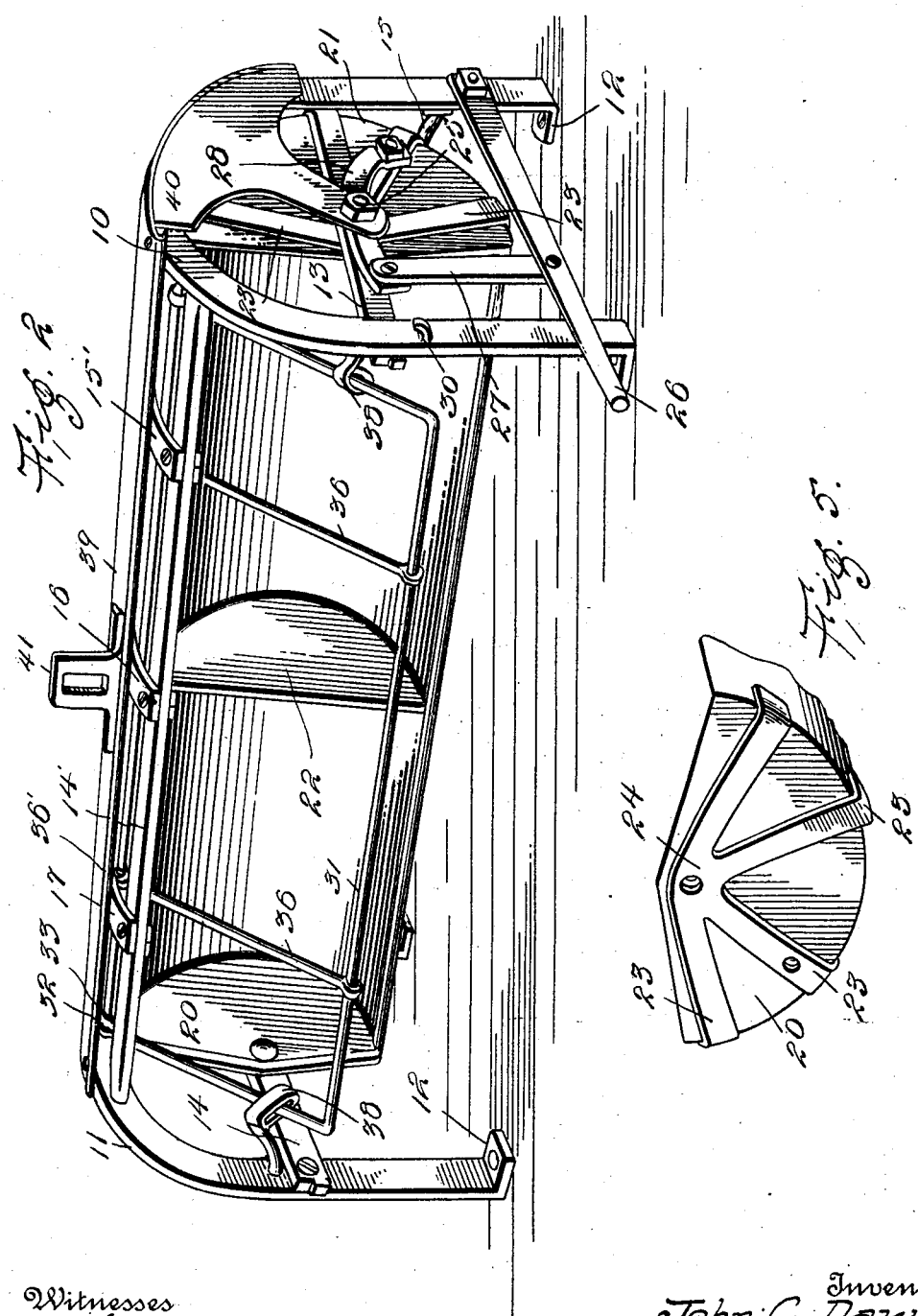

No. 755,753. Patented March 29, 1904.

UNITED STATES PATENT OFFICE.

JOHN C. DAVIS, OF CARWILE, OKLAHOMA TERRITORY.

HOG-TROUGH.

SPECIFICATION forming part of Letters Patent No. 755,753, dated March 29, 1904.

Application filed October 29, 1903. Serial No. 179,026. (No model.)

*To all whom it may concern:*

Be it known that I, JOHN C. DAVIS, a citizen of the United States, residing at Carwile, in the county of Wood, Territory of Oklahoma, have invented certain new and useful Improvements in Hog-Troughs; and I do hereby declare the following to be a full, clear, and exact description of the invention, such as will enable others skilled in the art to which it appertains to make and use the same.

This invention relates to hog-troughs employed in the feeding of hogs, although it will be understood, of course, that it may be employed in feeding other animals or for whatever other purpose it is adaptable. As hog-troughs are ordinarily made the receptacle for the food is fixed, and access thereto is had at all times to any part of the trough. The result is that the hogs are permitted to lie in the troughs, so that they are fouled, and owing to the fact that they are fixed it is very difficult to clean them. Furthermore, in the ordinary trough the hog is permitted to move freely from end to end thereof while feeding, so that the stronger hogs crowd the weaker ones.

It is the object of the present invention to provide a trough so constructed and mounted that it may be easily and quickly dumped by tilting it and so formed that when tilted its contents will pass freely from it or may be readily scraped out.

A further object of the invention is to provide a trough wherein the individual hogs will be kept separated, so as not to interfere one with the other, and will be prevented from climbing into the trough by means of a rack so mounted as to move automatically from its close relation to the trough when the latter is tilted, and thus move from such position as would interfere with passage of material from the trough.

An additional object of the invention is to provide means for shutting off access to the trough at times, so that the hogs may be excluded therefrom until after the feed has been properly placed in the trough, and, further, to provide such an arrangement of parts as will prevent egress of the hogs from the pen during manipulation of the trough.

Other objects and advantages of the invention will be understood from the following description.

In the drawings forming a portion of this specification, and in which like numerals of reference indicate similar parts in the several views, Figure 1 is a perspective view showing the trough with the parts in position ready for feeding. Fig. 2 is a perspective view looking at the opposite side of the trough with the pan in tilted position and the lid shifted to the opposite position from that shown in Fig. 1. Fig. 3 is an end elevation with the parts in the positions shown in Fig. 2, the end of the lid being broken away. Fig. 4 is a vertical section taken transversely through the trough, the guide for the rack being partly in section and the lid being in position to exclude the hogs from the trough. Fig. 5 is a perspective view showing one end portion of the pan with its hanger.

Referring now to the drawings, the present apparatus comprises a supporting-frame including the end arches 10 and 11, having the laterally-directed feet 12 at their lower ends, which are perforated to receive bolts or lag-screws for holding the structure to a suitable base, the arches being provided with cross-bars 13 and 14 against their inner faces, these cross bars or beams being horizontal and at the same height and having their extremities slightly reduced vertically and projecting beyond the edges of the arches. Connecting the tops of the arches, which latter are disposed parallel, is a longitudinal brace 14', a second brace 15 being connected to the legs of the arches at one side, the attached ends of this second brace being bent slightly downwardly and then outwardly, as illustrated.

Attached to the longitudinal braces above described are dividing-irons 15', 16, and 17, which in the structure illustrated are three in number, although it will be understood that any number may be employed. The upper portions of these dividing-irons are of arc shape and conform, substantially, to the curvatures of the end arches, the irons below the lower brace being straight and having outwardly-turned feet 19, through which may be engaged securing means for holding them to a suitable base.

The supporting-frame described is designed to receive the pan, its rack, and a lid. The pan, as illustrated, is semicircular in cross-section and is provided with correspondingly-shaped ends 20 and 21 and an intermediate transverse partition 22, it being understood that the frame, as also the trough, may be of any desired length and that it may be partitioned in such manner as best suits the ideas of the individual. The pan is carried in hangers, each of which is formed integral and consists of a metal plate which is slotted or bifurcated at both ends to form separate fingers 23, which are bent slightly in the plane of the plate, so that they radiate from the central or body portion 24 of the plate. The hanger is disposed with its body portion and fingers against the end of the pan, and the extremities of the fingers are bent laterally in the same direction beneath the pan, so as to form supports therefor. The pan, with its hangers, fits between the cross-bars of the end arches, and through these cross-bars are engaged pivot-bolts 25, which pass also through the ends of the pan and through the central or body portions of the hangers. These pivot-bolts are disposed to aline with the axis of transverse curvature of the pan, so that as the pan is swung or tilted on the pivot-bolts it will move within the boundaries of the supporting-frame.

To tilt the pan, a lever 26 is pivoted to one leg of the end arch 10, and pivoted to this lever is a link 27, pivoted in turn to an arm 28, which is attached to one of the fingers of the adjacent pan-hanger, and through which arm passes the corresponding pivot-bolt. The arm 28 lies against the outer face of the cross-bar 13 at that end of the structure, and its lower end is bent in the direction of the end of the pan beneath said cross-bar, as shown in Fig. 2, and is so positioned that when the pan is tilted to the proper position to dump its contents said bent portion of the arm will strike the cross-bar 13 and prevent further rotation of the pan. To tilt the pan to dumping position, the lever is depressed, and to return it to its position of use the lever is raised and is held against movement from the raised position by means of a pin 30 on the end of the frame and over which the lever is engaged.

The dividing-irons above referred to serve to prevent the hogs from crowding each other bodily, a rack being provided to prevent them from rooting each other while feeding. The rack consists of a U-shaped frame 31, the ends of which are bent to form eyes 32 and are engaged around a bar 33, over which one longitudinal edge of the pan is beaded, said pan having also a bar 34 at its opposite longitudinal edge. The frame is pivotally movable on this bar 33, which latter is at that edge of the pan next to the dividing-irons, which may be termed the "front." Cross-bars 36 are connected to the bight portion of the U-shaped frame parallel with the ends of the latter and have eyes 36' formed at their ends, which engage around the rod 33, the front edge portion of the pan below the bar 33 being cut away or perforated to permit of passage of the eye of the bar therethrough. It is the rear edge of the pan that is lowered in the dumping operation, so that the pan is dumped out of the pen instead of into it, the wall of the pen passing centrally and longitudinally over the pan when the latter is in its opposite position, so that the front half of the pan, with the frame, projects into the pen, while the rear half lies exteriorly thereof. When the pan is dumped, the frame must be moved from its position close against the pan, so as not to interfere with passage of matter from the pan, and for this purpose guide-loops 38, secured to the end arches of the frame, receive slidably the ends of the rack, and as the rear side of the pan is lowered in the tilting operation these loops so direct the movement of the rack as it slides therethrough that the rear portion of the rack lies in spaced relation to the rear edge of the pan when the latter is at the limit of its tilting movement.

It will be noted that when the pan is tilted the bottom thereof acts as a closure for the spaces between the dividing-irons. In order that access of the hogs to the pan may be prevented when the pan is in its operative or feeding position, a lid is provided comprising a plate 39, which is bent transversely to form an arc of approximately ninety degrees and of a curvature corresponding to that of the end arches of the supporting-frame. The plate extends slightly beyond the end arches, where it is provided with radial arms 40, which are pivotally mounted on the same bolts with the pan. The projecting ends of the cross-bars 13 and 14 at opposite sides of the supporting-frame form, alternately, stops or rests for the lid, so that when the lid is shifted to one side of the frame to rest on the stops at that side it will cover that portion of the frame between that side of the pan and the upper longitudinal brace of the supporting-frame, and when the lid is shifted to the opposite position it covers that portion between said longitudinal brace and the opposite side of the frame. The lid is provided with a hasp 41 for engagement over a staple, to which it may be held, by means of a pin, in the usual manner to hold the lid in its closed position or over the spaces between the dividing-iron at the front of the pan.

It will be understood that in practice modifications of the specific construction shown may be made, and any suitable materials and proportions may be used for the various parts without departing from the spirit of the invention.

What is claimed is—

1. A hog-trough comprising a supporting-frame, a feeding-pan mounted in the frame and movable to dump its contents, a dividing-rack disposed above the pan and connections between the rack and pan for moving the rack away from the pan when the latter is moved into dumping position.

2. A hog-trough comprising a supporting-frame, a feeding-pan pivoted in the frame and movable into and out of dumping position, a dividing-rack pivoted to the side of the pan which is uppermost when the pan is in tilted position, and guides with which the rack is engaged, said guides being disposed to direct the free edge of the rack away from the pan when the latter is tilted.

3. A hog-trough comprising a pan, and a supporting-frame for the pan comprising dividing means at the edge of the pan arranged to permit of access of hogs between them to the pan, said pan being movable in the frame into and out of dumping position and arranged to close the interspaces between the dividing means when in dumping position.

4. A hog-trough comprising a pan and a supporting frame for the pan, said pan being movable in the frame into and out of dumping position and arranged to close the frame at the feeding side thereof when in dumping position, and means at the opposite side of the frame from the feeding side, for shifting the pan.

5. A hog-trough comprising a frame, hangers pivoted in the frame, a pan having its ends engaged in the hanger, a rack pivotally connected with one edge of the pan and movable into and out of position with the opposite edge of the pan as the pan is tilted and means for tilting the pan.

In testimony whereof I affix my signature in presence of two witnesses.

JOHN C. DAVIS.

Witnesses:
M. E. TUCKER,
GEO. H. CHANDLEE.